United States Patent
Baumbusch et al.

(10) Patent No.: US 6,668,208 B2
(45) Date of Patent: Dec. 23, 2003

(54) AUTOMATIC ALLOCATION OF MACHINING OPERATIONS TO A PLURALITY OF MACHINING STATIONS

(75) Inventors: Frank Baumbusch, Eberbach (DE); Walter Bauer, Simmozheim (DE)

(73) Assignee: Witzig & Frank GmbH, Offenburg (DE)

(*) Notice: Subject to any disclaimer, the term of this patent is extended or adjusted under 35 U.S.C. 154(b) by 16 days.

(21) Appl. No.: 10/015,159

(22) Filed: Dec. 11, 2001

(65) Prior Publication Data

US 2002/0107606 A1 Aug. 8, 2002

(30) Foreign Application Priority Data

Dec. 14, 2000 (DE) .......................... 100 62 471

(51) Int. Cl.[7] .............................................. G06F 19/00
(52) U.S. Cl. .................... 700/169; 700/99; 700/100; 700/112; 700/114; 700/159
(58) Field of Search ................. 700/100, 99, 113, 700/114, 169, 112, 159; 29/563; 414/222.13; 483/15

(56) References Cited

U.S. PATENT DOCUMENTS

| | | | | |
|---|---|---|---|---|
| 4,473,883 A | * | 9/1984 | Yoshida et al. | 700/179 |
| 5,477,117 A | * | 12/1995 | Saito | 198/460.1 |
| 5,880,965 A | * | 3/1999 | Nakamura et al. | 700/175 |
| 6,154,684 A | * | 11/2000 | Schwenke et al. | 700/169 |
| 6,178,608 B1 | * | 1/2001 | Koch | 29/563 |

FOREIGN PATENT DOCUMENTS

| | | |
|---|---|---|
| DE | 31 46 342 C3 | 6/1982 |
| DE | 36 02 457 A1 | 3/1987 |
| DE | 0 470 257 A1 | 2/1992 |
| DE | 40 31 033 A1 | 4/1992 |
| DE | 197 25 101 A1 | 1/1998 |
| DE | 197 47 574 A1 | 5/1999 |
| DE | 198 49 375 A1 | 4/2000 |

OTHER PUBLICATIONS

"Jedem Werkzeug seine eigene Spindel", *Produktion*, Jul. 19, 1998, pp. 8–9, No. 28, Germany.

* cited by examiner

Primary Examiner—Albert W. Paladini
(74) Attorney, Agent, or Firm—Cohen, Pontani, Lieberman & Pavane

(57) ABSTRACT

A technique for controlling a machining system having a plurality of machining stations for machining workpieces with a plurality of machining operations. Each of the plurality of machining operations is allocated automatically to a specific one of the machining stations to attain uniform utilization of the individual machining stations, to the extent possible. This facilitates the initial setup of the machining system as well as correcting the setup if machining errors or deviations occur.

47 Claims, 8 Drawing Sheets

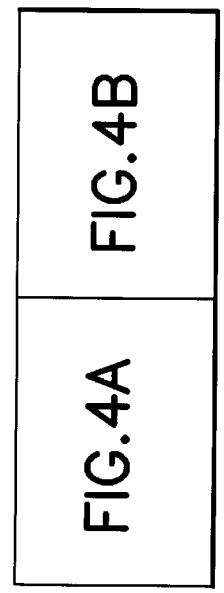

AUTOMATIC ALLOCATION OF MACHINING OPERATIONS TO A PLURALITY OF MACHINING STATIONS

FIELD OF THE INVENTION

The invention relates to controlling a machining system having a plurality of machining stations and, more particularly, for automatically allocating each of a plurality of machining operations to a specific one of the machining stations.

BACKGROUND OF THE INVENTION

Machining systems, such as machine tools and production systems, are designed to machine workpieces by passing them through a plurality of machining stations. Each machining station includes a plurality of machining units, such as rotatably-driven tool turrets. If these turrets are arranged to machine the workpiece from two different directions, then a plurality of machining operations can be performed simultaneously on the same workpiece. Each turret is provided with a plurality of work spindles to which a tool can be attached for performing a machining operation, such as milling, drilling and thread-cutting. The machining of a workpiece typically requires multiple machining operations, and these are performed as the workpiece is placed in different positions at the various machining stations.

It is often quite complicated to set up the various machining stations for handling the machining operations required to machine a workpiece because, in conventional machining systems, the machining operations required to machine the workpiece are allocated manually by an operator to the various work spindles of the machining system. In order to maximize throughput, at least one work spindle should be operating at each machining station at all times. However, with the conventional, manual approach it is problematic to distribute the individual machining operations to the machining stations in such a way that the machining system operates at its maximum output by minimizing the wait times during which a turret is idle. This has made it difficult to operate such machining systems at a high efficiency.

SUMMARY OF THE INVENTION

One object of the invention is to provide an improved technique for controlling a machining system having a plurality of machining stations used to machine a workpiece.

Another object of the invention is to provide a technique for maximizing the output of a machining system having a plurality of machining stations used to machine a workpiece.

A further object of the invention is to facilitate the control of a machining system having a plurality of machining stations used to machine a workpiece.

Yet another object of the invention is to automate the control of a machining system having a plurality of machining stations used to machine a workpiece.

One other object of the invention is to automate the allocation of machining operations to the plurality of machining stations provided in a machining system to machine a workpiece.

These and other objects are attained in accordance with one aspect of the present invention directed to a machining system for machining a workpiece, comprising a plurality of machining stations with each one having at least one work spindle, means for providing machining information related to a plurality of machining operations specific to a particular workpiece, distribution means for automatically allocating the plurality of machining operations to the plurality of machining stations, and processing means for controlling the machining stations in accordance with the machining information related to the allocated machining operations.

Another aspect of the present invention is directed to a method for machining a workpiece with a plurality of machining stations, with each one having at least one work spindle, comprising providing machining information related to a plurality of machining operations specific to a particular workpiece, automatically allocating the plurality of machining operations to the plurality of machining stations, and controlling the machining stations in accordance with the machining information related to the allocated machining operations.

A further aspect of the present invention is directed to an article of manufacture for use in a computerized machining system, for machining a workpiece with a plurality of machining stations each one having at least one work spindle, and having a computer-readable code means for providing machining information related to a plurality of machining operations specific to a particular workpiece, automatically allocating the plurality of machining operations to the plurality of machining stations, and controlling the machining stations in accordance with the machining information related to the allocated machining operations.

DETAILED DESCRIPTION OF THE DRAWINGS

Figure 1:
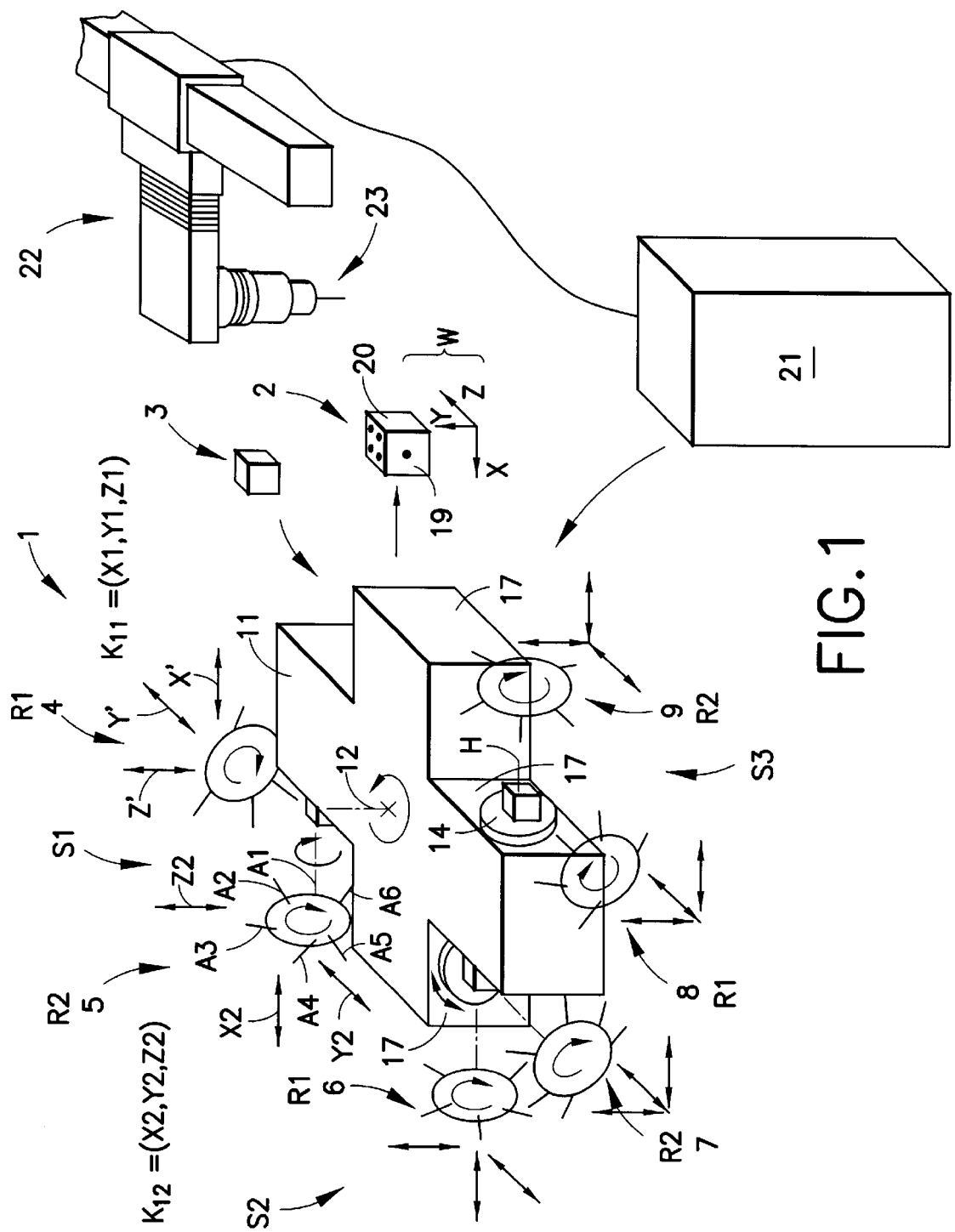
FIG. 1 is a schematic perspective view of a machining system with a measuring instrument and control device.

FIG. 1 shows a machining system 1 which is used to make workpieces 3 from blanks 2. The machining is done by metal-cutting performed in a plurality of machining stations Si (i=1 . . . ). For purposes of illustration only, three machining stations S1, S2, S3 are shown, with each machining station having two machining units R1 and R2, such as tool turrets. Of course, other types of machining units can also be used. For example, the machining system can include several machine tools each having at least one work spindle, but no turret. However, for purposes of simplicity and ease of explanation, the term "turret" will be used herein to represent any type of suitable machining unit.

In FIG. 1, turrets R1 in the respective machining stations S1, S2, S3 are 4, 6 and 8. Turrets R2 in the respective machining stations are 5, 7 and 9. The turrets are, for example, crown turrets each having a plurality of work spindles, such as A1, A2, A3, A4, A5, A6. This arrangement of work spindles is illustrated in FIG. 1 using the turret 5 as an example. Corresponding work spindles A1 through A6 are provided on all the other turrets 4, 6, 7, 8, 9.

Each of turrets 4 through 9 is disposed rotatably. Thus, for any particular turret, each of its work spindles A1 through A6 can be selectively put into a position that points toward the workpiece 3 positioned in its machining station.

For transporting the workpieces 3 from one machining station to the next and for positioning the workpieces 3 in the machining stations, a workpiece carrier 11 is provided, which is supported rotatably for movement about a vertical axis 12. The workpiece carrier is embodied in the approximate shape of a cross having its perimeter defined by side faces 17. Clamp tables 14 are provided on at least some of these side faces 17 to support the workpieces 3. Each clamp table 14 has a surface to which a workpiece can be secured, such as by clamping, and the table itself can be rotated about a horizontal axis H which is perpendicular to the table surface carrying the workpiece. The overall arrangement is such that the turrets R1 each point toward the side faces 19 of the workpieces 3 which are parallel to axis H, while the turrets R2 each point to the end faces 20 of the workpieces 3 which are perpendicular to axis H.

The turrets 4 through 9 are each supported so as to be vertically and horizontally adjustable by positioning units. Although these positioning units are not shown, they are represented by three arrows for each of turrets 4 through 9 in FIG. 1. One positioning unit is provided for vertical adjustment of each turret 4 through 9, and two positioning units are provided for horizontal adjustment of each unit. The associated adjustment directions X, Y, Z are specifically defined in all the machining stations (that is, for all the turrets 4 through 9).

As shown schematically in FIG. 1, the machining system 1 is controlled by a control device 21, which monitors and actuates motion of the above-described positioning units, clamp tables, workpiece carrier, and so on. The control device 21 can be connected to a measuring instrument 22, which is schematically shown in FIG. 1 to have a positionable measurement head 23 to determine the dimensions of a machined workpiece 3.

Figure 2:
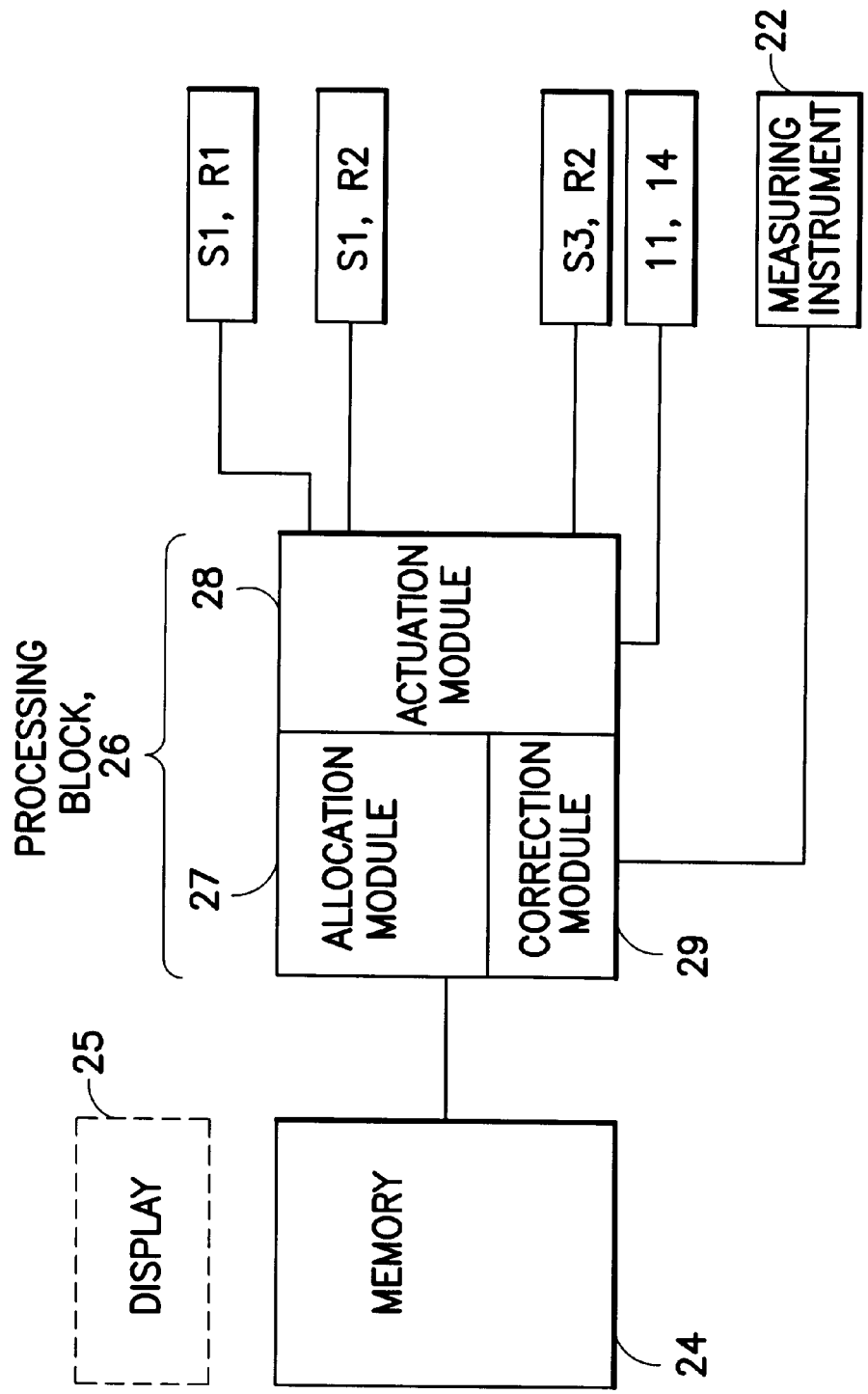
FIG. 2 is a schematic block diagram of the control device of FIG. 1.
Figure 4A:
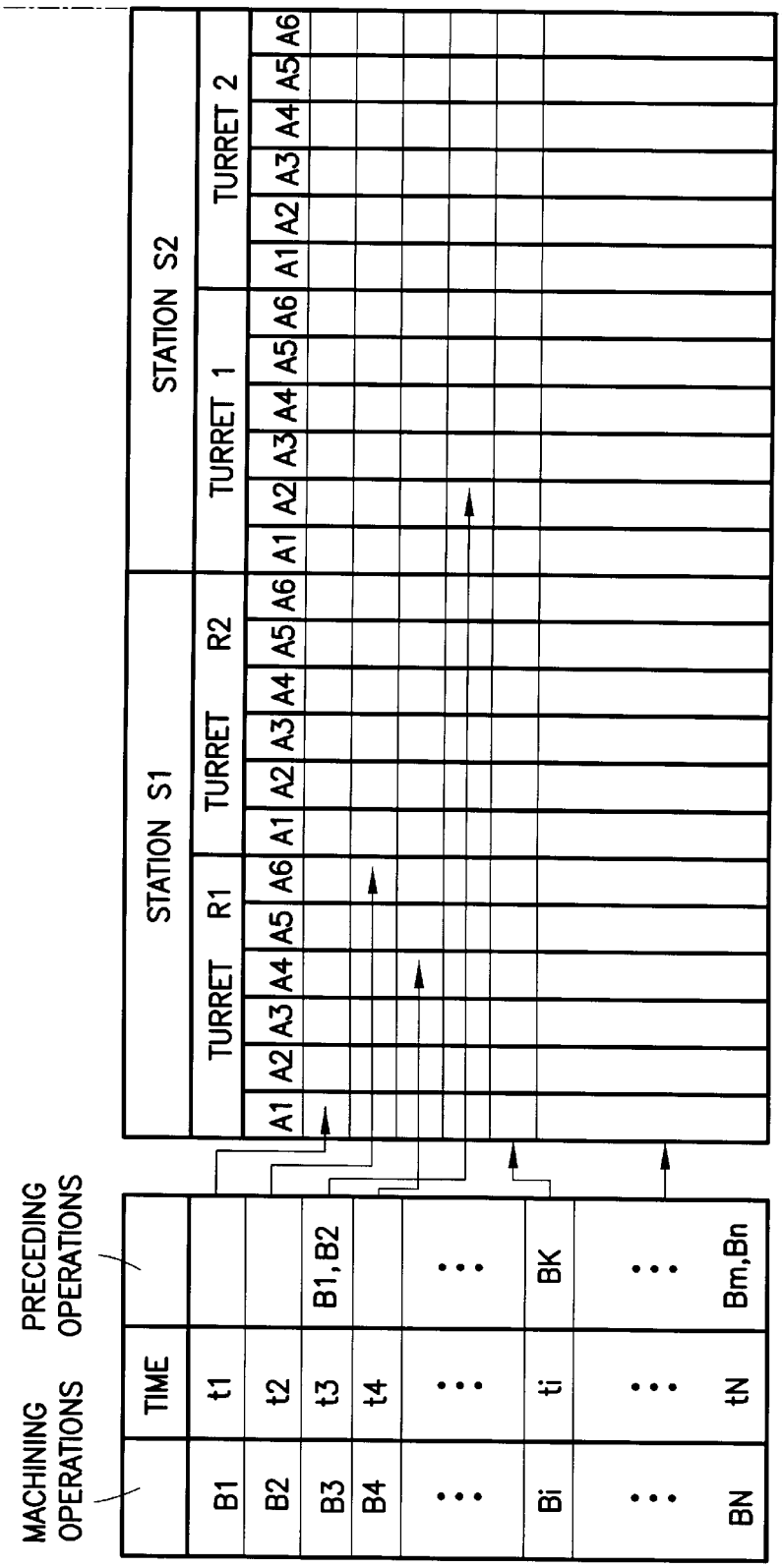
FIG. 4 is a table that lists the data structure for describing individual machining operations to machine a workpiece and a juxtaposed chart showing the distribution of the machining operations to various machining stations.

The control device 21 is schematically illustrated in FIG. 2. A memory 24 stores workpiece-specific machining information. This information comprises a list 16, such as is shown in FIG. 4, of all the individual machining operations Bi (i=1 through N) required to produce workpiece 3. A customized list is created for each newly-designed workpiece. For each of the machining operations, portion 16a of list 16 specifies the type of operation to be performed (e.g. milling, boring, cutting) the tool to be used (e.g. type, diameter), the rotational speed of the tool, the speed of relative movement of workpiece and tool, the x,y,z coordinates of the beginning and end of the relative movement, and the path that the tool is to follow. The information can be stored as data in any appropriate form depending on the programming language or data format that is adopted. The machining time ti that each machining operation requires is specified in portion 16b of list 16. In addition, information pertaining to the required machining sequences and machining conditions is provided in portion 16c of list 16. An example of sequencing, or chaining, is shown for the machining operation B3. Portion 16c specifies that machinery operation B3 can take place only if the machining operations B1 and B2 have been performed beforehand. This is the case, for instance, for a finish machining operation which must be preceded by a rough-machining operation.

Another example of such chaining is with a threaded bore because the thread-cutting operation cannot be performed until the bore has been drilled.

The control device 21 shown in FIG. 2 can have a display unit 25, so that the specified machining operations can be shown alphanumerically or graphically and, optionally, altered. An image reproduction device (screen) and input devices, such as a keyboard and graphic input devices can be used for this purpose.

A processing block 26 is connected to the memory 24 and converts the workpiece-specific machining information stored in memory 24 into machine control data. To that end, the processing block 26 includes an allocation module 27, which distributes (this word is used interchangeably herein with "allocates" in referring to the assigning of each machine operation to a specific machine station, in terms of its turrets and work spindles, at a particular time in the machining cycle of the workpiece) the individual machining operations Bi of FIG. 4 to the various individual machining stations and their turrets and work spindles. Once the distribution has been done, the allocation module outputs the corresponding data to actuation module 28 (FIG. 2), which on the basis of this allocation generates machine control instructions for the individual turrets R1, R2 and their work spindles A1 through A6. Thus, one output of actuation module 28 is shown by FIG. 2 to be allocated to the machining stations, such as to S1, R1, A4 (i.e. work spindle A4 of turret R1 in machining station S1). The actuation module 28 also generates movement commands for the workpiece carrier 11 and the clamp tables 14.

The measuring instrument 22 is used for feedback to correct the machine control instructions which control the individual work stations S1, S2, S3 and, if applicable, the clamp tables 14. Measuring instrument 22 is connected to a tracking module 29 that communicates via the allocation module 27 with the actuation module 28, so that the actuation module 28 can change the machine control instructions of the individual machining stations in accordance with the measurement results. The tracking module 29 can conduct a statistical evaluation of the measurement results in order, in particular, to detect long-term drift due to, for example, temperature increases in the coolant, lubricant and machine components. Such long term effects can be identified statistically over many workpieces rather than focusing on any one workpiece which may have an error specific only to it.

The operation of the system is as follows. Based on the workpiece-specific machining information, the allocation module 27 first sets up machining station lists for the individual machining stations, as shown in table 18 of FIG. 4. A similar table (not shown) is created for the workpiece carriers 11 and the clamp tables 14.

Table 18 of FIG. 4 shows that machining operation B1 has been allocated to work spindle A1 of turret R1 in machining station S1. Operation B2 has been allocated to workstation A6 of turret R1 (in the next operation of the turret, the succeeding operations being in the sequentially arranged rows). Machining operation B4 has been allocated to machining station S2 (for reasons as per the explanation provided below), to be performed by work spindle A2 of turret R1. Significantly, it must be noted that B3 is carried out after B1 and B2 have been completed, as required by the sequencing set in 16c. Machining operation B3 has been allocated to work spindle A4 of turret R1 in machining station S1.

Figure 3:
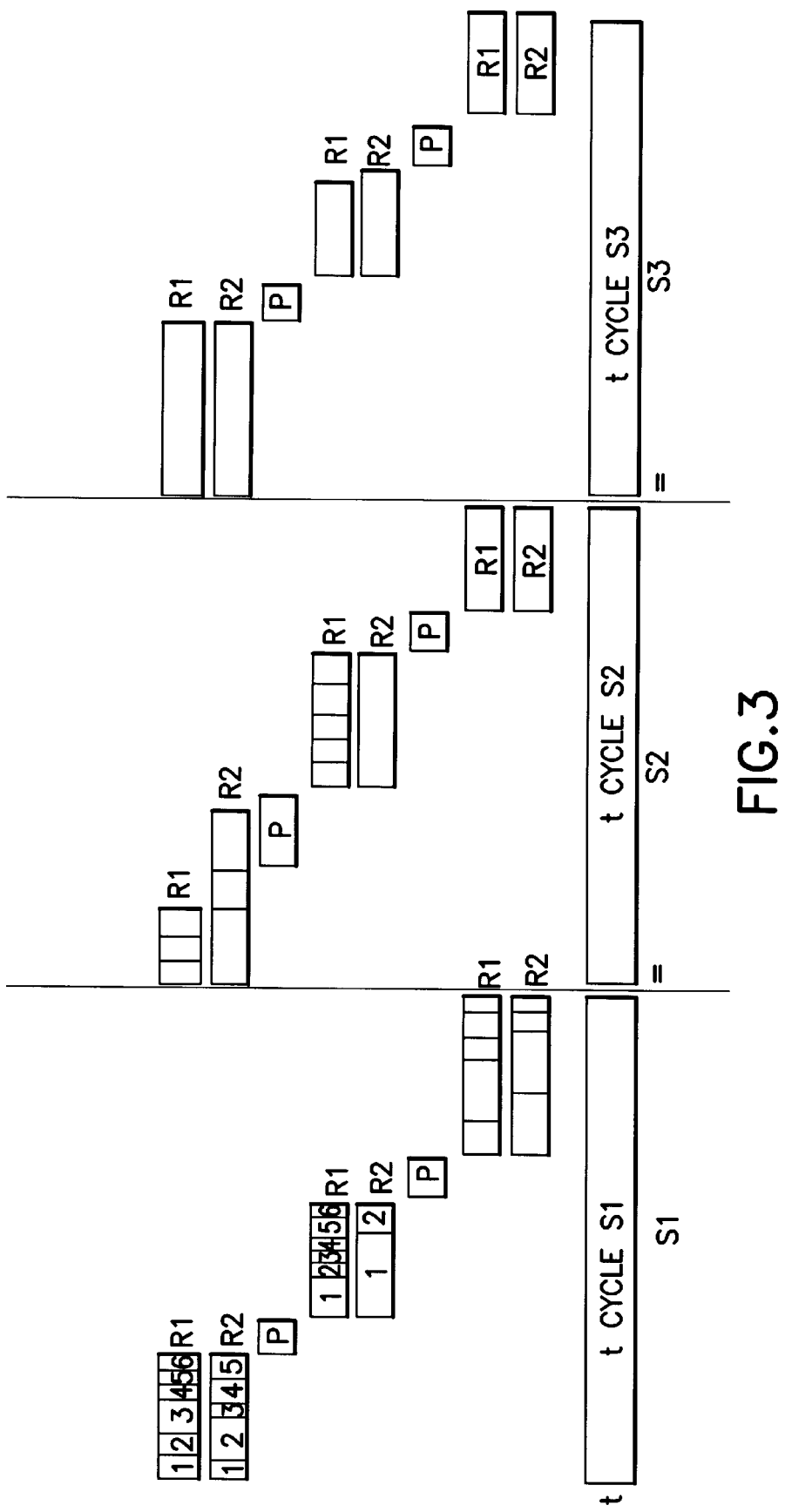
FIG. 3 is a timing diagram that shows the staggered timing for operating the turrets in three machining stations in accordance with the entries made into the table of FIG. 4.

In FIG. 3, machining of the workpiece is shown in machining station S1 in three fixed workpiece positions, in machining station S2 in three fixed workpiece positions and also with machining of a moving workpiece, and in machining station S3 again in three fixed workpiece positions. As needed, more workpiece positions, or different ones, can also be used in each cycle of each machining station. Each machining station has a cycle time which is the total of the machining times $t_1$ (see 16b in FIG. 4) for the machining operations allocated to it. As explained in detail below, the machining operations Bi are distributed to the individual machining stations in such a way that substantially the same cycle time is obtained for all of the machining stations.

In the first machining station S1, the turrets R1, R2 are simultaneously brought into engagement with the workpiece 3. Each of the turrets R1, R2 in a machining station can be rotated into different positions independently of the other turret. Thus, as needed, each of the work spindles A1 through A6 (NOTE: due to lack of space on FIG. 3, the work spindles are identified as 1–6, rather than A1–A6) can be brought into individual engagement with the workpiece 3. Once the machining of the workpiece 3 in a particular workpiece position has been completed, both turrets R1, R2 are moved such that the tools thereon which are then being used disengage from the workpiece. In the pause period P, the clamp table 14 can be re-positioned, after which both turrets R1, R2 are once again moved into position to machine the workpiece. In this way, the machining of workpieces can proceed simultaneously in all the machining stations S1, S2, S3.

In the machining station S2, after the turret R1 has been moved to disengage its working tool from the workpiece for pause period P, the tool on turret R2 remains in engagement with the workpiece while clamp table 14 is moved. This is done, for instance, for milling a curved groove or a circumferential groove, which requires moving the workpiece while it is in engagement with the tool.

The distribution of the machining operations Bi is done in such a way that the work spindles of turrets R1, R2 are working as much of the time as possible, and they come out of engagement with the workpiece 3 only whenever the workpiece is being positioned (except for certain machining operations, such as depicted for machining station S2). The indexing movement of the workpiece carrier 11 occurs during pause periods P, at the end of the cycle time, in which tools on all of the turrets R1, R2 in all of the machining stations are simultaneously out of engagement with the workpieces 3. These latter pause periods are represented by vertical lines 30 shown in FIG. 3.

Figure 5:
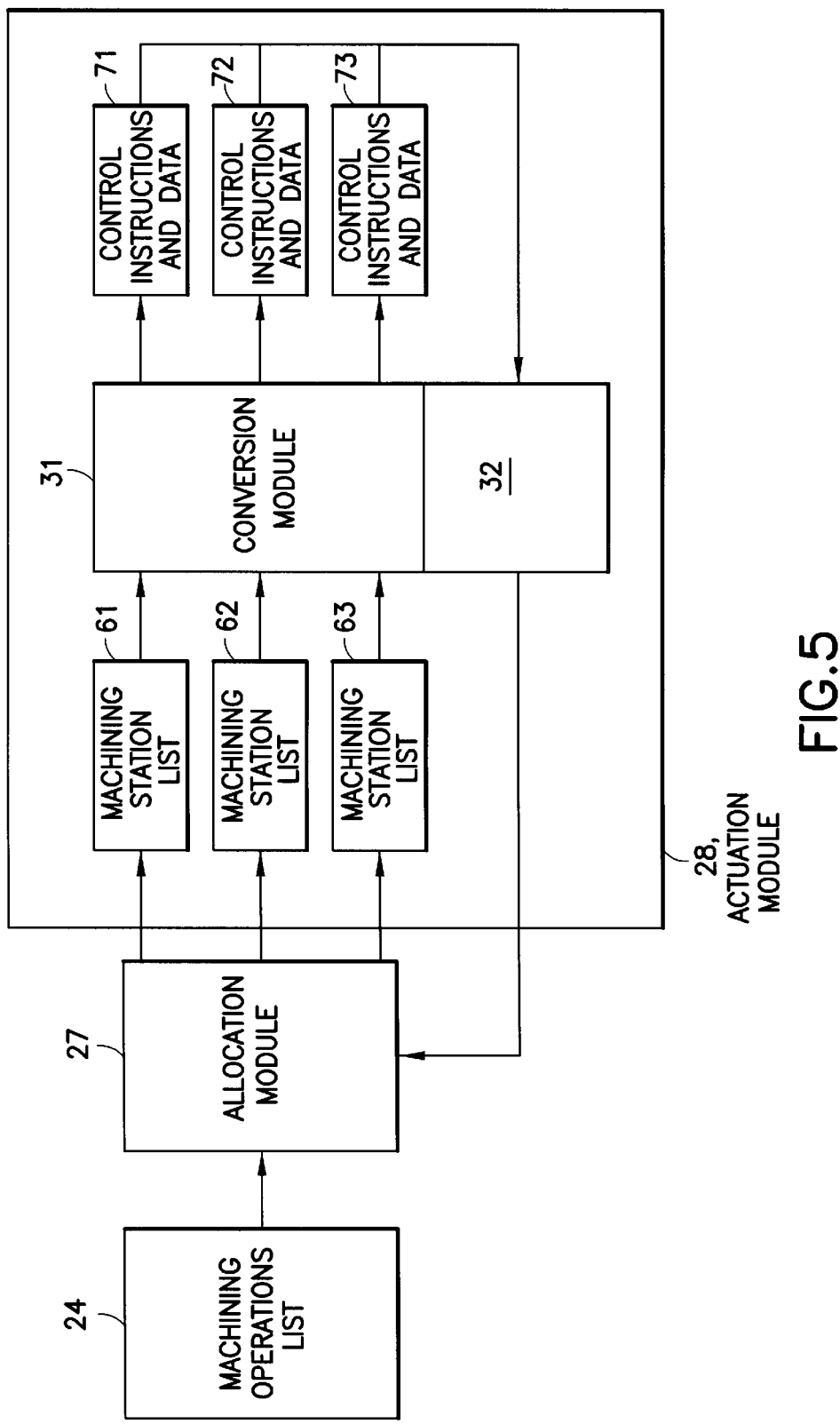
FIG. 5 is a schematic block diagram corresponding to FIG. 2 but showing the actuation module in greater detail.

The distribution of the various machining operations to the machining stations is done by the processing block 26 which is shown in further detail in FIG. 5. The allocation module 27 of block 26 obtains from memory 24 the workpiece-specific machining information, corresponding to list 16 in FIG. 4, and performs an allocation of the machining operations to the individual machining stations to generate machining station lists that are stored in memories 61, 62, 63, respectively, for the machining stations S1, S2, S3 respectively. Each of these machining station lists specifies the machining operations allocated to a specific one of the machining stations, as shown in table 18 of FIG. 4. The machining operations on the machining station lists are inputted to a conversion module 31. From the machining operations allocated to the various machining stations, the conversion module 31 determines machine control instructions, including control commands along with the associated control data. These machine control instructions are, for example, in the form of CNC programs that are stored in memories 71, 72, 73 and can be applied to control turrets 4 through 9 and their work spindles. Conversion modules that translate the workpiece-specific machining information into machine control instructions in the form of a CNC program are well known and readily available. Thus, providing a detailed explanation and description thereof is not deemed necessary. The CNC programs are synchronized with each other. This means that, as is well known, the CNC programs of different work spindles or other axes of a machine tool have synchronizing instruction that make sure that special instructions of one program will not start before other instructions of the synchronized program are carried out, and so that the workpiece carrier 11 can move from one machining station to the next with uniform timing. The CNC program also includes all the positioning commands for the positioning units of the turrets, the workpiece carrier 11 and clamp tables 14.

From the allocated machine control instructions stored in memories 71, 72, 73, the cycle time required by each machining station to perform the machining operations allocated thereto can be calculated by calculation module 32 which totals the respective machining times $t_i$. The individual machining operations can also be checked for whether the required synchronization (as described above) actually exists. It is possible that synchronization does not actually exist even though the allocation module has distributed the machining operations in such a way that there is synchronization among the individual turrets R1, R2 of a machining station. This is due to the fact that while the machining times $t_1$ are noted in the machining operations list 16, nevertheless the positioning times required for them are not yet known. The positioning times are not obtained until the actual machine control instructions are set up since in setting up the positioning instructions, in a given machining station the position of the turrets must be taken into account along with the machining station at which each new machining operation begins. The positioning time depends on the type and sequencing of the selected machining operations. Accordingly, it may become necessary for the allocation module 27 to perform a corrected allocation, on the basis of the results determined by the calculation module 32. To obtain a uniform cycle time among the machining stations S1, S2, S3, a plurality of iteration runs (i.e. distribution by allocation module 27, conversion by conversion module 31, and calculation by calculation module 32) may be necessary.

Once the machine control instructions for the individual machining stations is derived in this way, allocation table 18 is updated for the allocations of the individual machining operations to the individual machining stations. Table 18 is stored in the allocation module 27, or in a memory connected to it.

Measuring instrument 22 measures each of the dimensions of workpieces 3 to determine whether any of the dimensions deviates beyond a given tolerance from the specified dimensions. Correction of the machining control instructions and data stored in allocation table 18 is made based on the out-of-tolerance workpiece dimension measured by the measuring instrument 22.

More specifically, the measurements obtained by the measuring instrument 22 are used for correcting the CNC programs for the individual machining stations without the operator having to know in detail with which work spindle A1 through A6, of which turret R1, R2, of which machining station S1, S2, S3, the applicable machining operation is performed by to produce the problematic measured dimension. The measuring instrument 22 is connected for this purpose to correction module 35 which performs the correction based on inputs it receives from measuring instrument 22 and allocation module 27. In particular, the correction module 35 can receive information entered into the allocation table 34 indicating which work spindle in which turret in which machining station performs the machining operation of interest that is responsible for the problematic dimension. This includes the information, also taken from the allocation table 34, indicating the position in which the workpiece 3 is located (position of the clamp table 14). The difference between the desired dimension and the measured dimension obtained from measurement instrument 22 is determined by correction module 35. If the difference is beyond a predetermined tolerance, then correction module 35 determines the appropriate corrective action and inputs it to conversion module 31 which suitably revises the control instructions. Correction module 35 adds or subtracts the measured differences to or from the machining information defining the workpiece. Thereafter, the corrected machining information is translated into machining control instructions by conversion module 31. The function performed by correction module 35 is conventional and, therefore, no details thereof are deemed needed.

Figure 6:
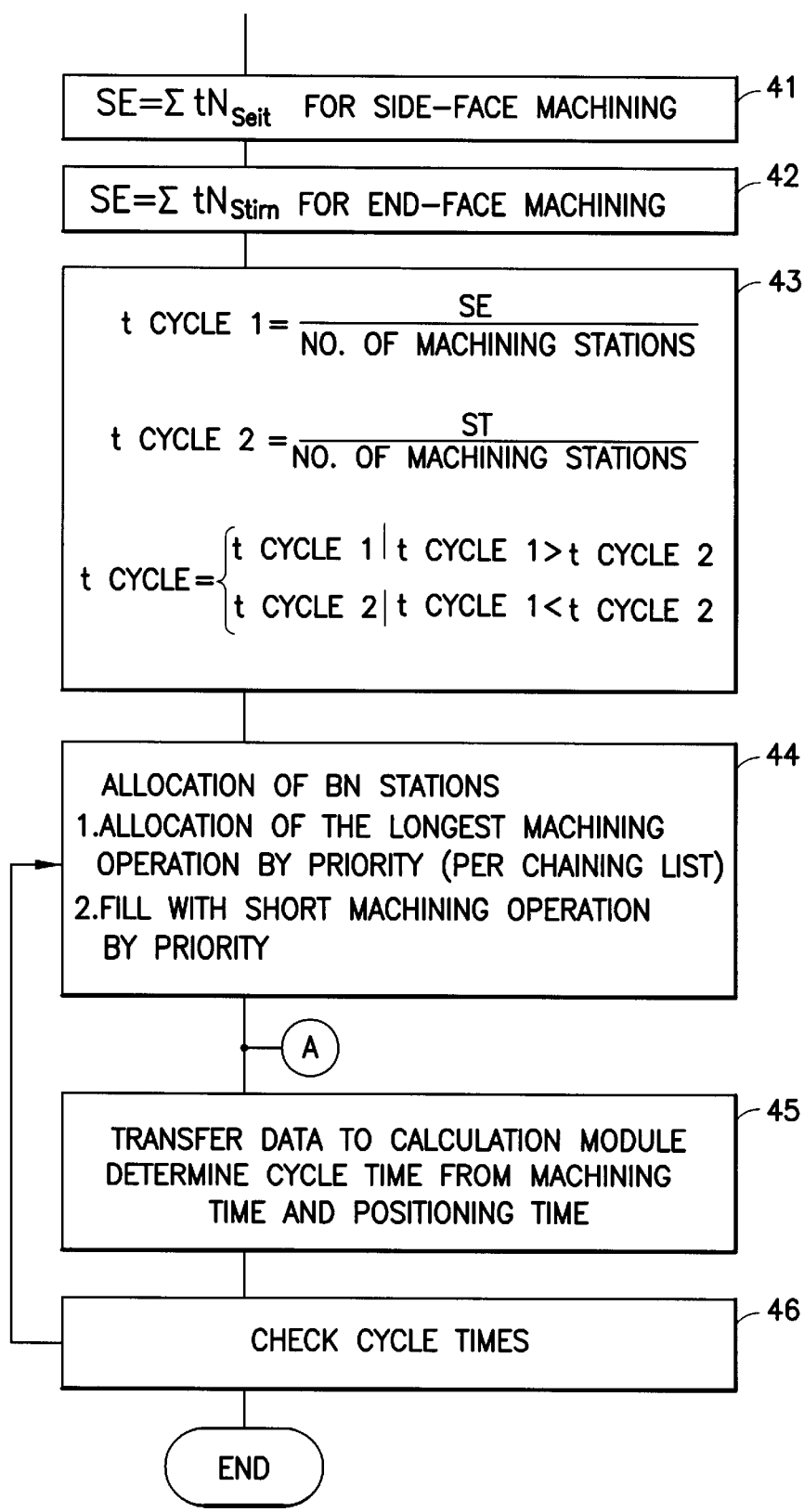
FIG. 6 is a flow chart to illustrate the functions of the allocation module.

The function of the allocation module 27 will be described in connection with FIGS. 6 and 7. FIG. 6 depicts how the allocation module distributes the individual machining operations Bi to the machining stations, turrets and work spindles. Allocation module 27 begins this task by adding up all the machining times $t_i$ for machining the side faces 19, and all the machining times $t_i$ for machining the end faces 20 of a workpiece 3, as per blocks 41, 42. To arrive at an estimate of the minimum cycle time "t cycle" that could be attained in each machining station, first the total time for machining the side faces 19 is divided by the number of available machining stations. The result is "t cycle 1". Correspondingly, the machining time required for machining all the end faces 20 is divided by the number of available machining stations. The result is "t cycle 2". The expression "machining the side faces" should be understood to mean machining the faces 19 of the workpiece that are machined from a direction perpendicular to axis H of the workpiece. The expression "machining the end faces" should be understood to mean machining the faces 20 that are machined from a direction parallel to the axis H of the workpiece. The minimum cycle time is understood to be either "t cycle 1" or "t cycle 2", whichever one is longer. This estimate of the minimum cycle time is made in block 43.

Block 44 of FIG. 6 shows that the longest machining operations are the first ones to be allocated to the machining stations. Then, using the "t cycle" determined as described above, the cycles of the machining stations are filled by allocating the machining operations of shorter durations.

Figure 7:
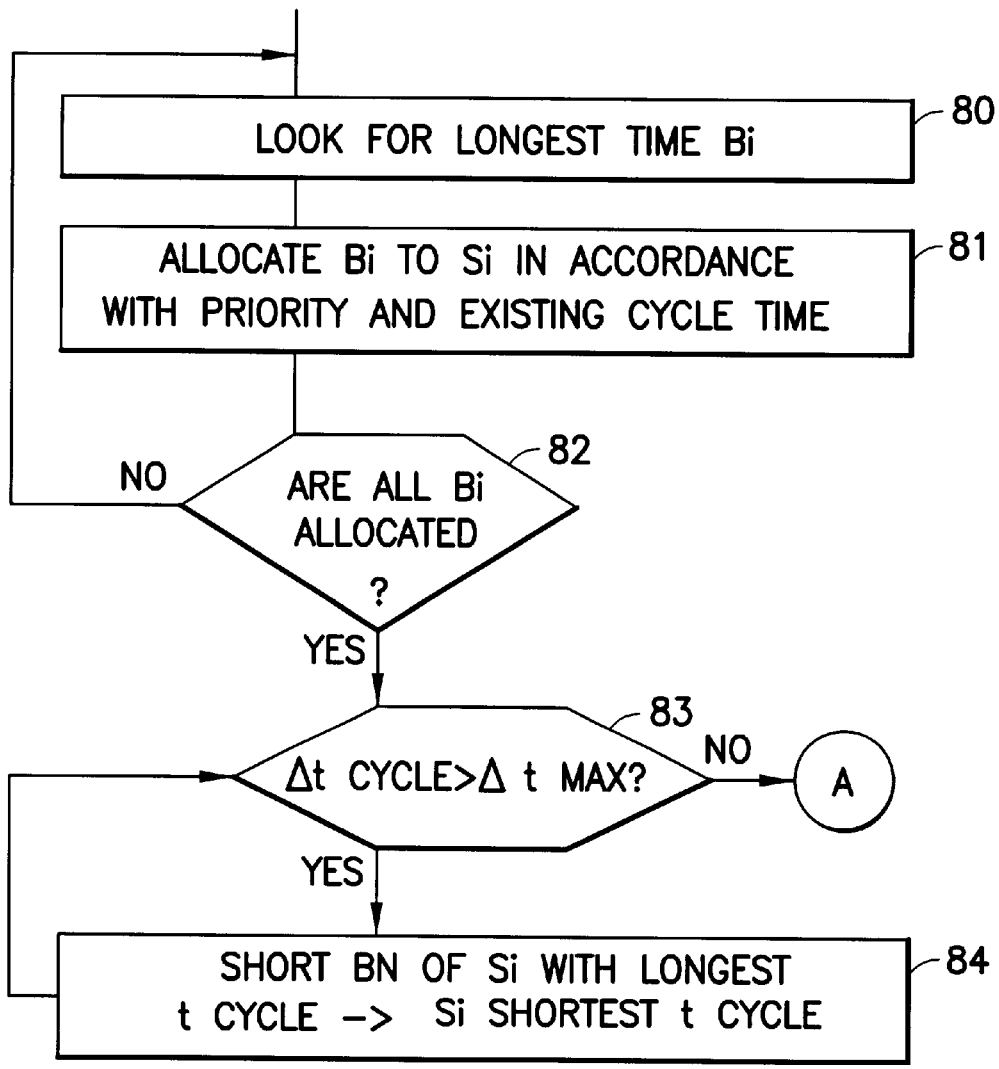
FIG. 7 is a flow chart to illustrate in greater detail the block 44 of FIG. 6.

The steps represented by block 44 are shown in greater detail by FIG. 7. The distribution of the various machining operations Bi to the machining stations S1 and their turrets and work spindles is done in accordance with their priority, with the longest machining operations having the highest priority. This means that in the list 16 of machining operations shown in FIG. 4, the machining operation Bi with the longest machining time $t_i$ is searched for first, as shown by block 80 in FIG. 7, and it is allocated to one of the machining stations per block 81. If a particular machining operation does not require any preceding machining operation (per 16c in FIG. 4), then the machining operation can be allocated to the first machining station S1. Otherwise, it is preferably allocated to machining station S2 or S3, as was done with B3 in FIG. 4, so that this machining operation can be performed later in the machining sequence, namely after the required preceding machining operation has had an opportunity to be performed.

Subsequent to that, the machining station cycles are filled with shorter machining operations of a shorter duration. This is done by first checking whether all the machining operations Bi have received an allocation, per block 82. If not, then from the remaining machining operations, whichever one is the longest is searched for and then allocated by blocks 80 and 81, as explained above, to a machining station. This is done based on the additional criterion that, if at all possible, the allocation should be to a machining station that has the greatest amount of free time remaining, as per block 81.

As soon as all the machining operations have been distributed, a check is conducted, per block 83, whether the resultant cycle times in the individual machining stations exceed a predetermined maximum difference value $\Delta tmax$. The cycle times are each obtained by means of an estimating operation, which adds up the machining times $t_i$ specified in 16b of FIG. 4. An additional amount of time to account for average positioning times can be applied throughout. The cycle times of all the machining stations are compared to each other. If the maximum variation does not exceed $\Delta tmax$, then the program has found an acceptable allocation and can continue, as shown in FIG. 6, with block 45 to transfer the data about the allocation to actuation module 28. If not, then as shown by block 84 in FIG. 7, the program attempts to minimize the differences between the individual cycle times. This includes the shifting of short machining operations out of the machining stations having the longest cycle time to machining stations with what was previously the shortest cycle time. This can be concluded in accordance with various criteria. For instance, it is possible to stop after a fixed number of attempts, or if the existing cycle time differences cannot be further reduced after several attempts.

As illustrated in FIG. 6 by block 45, the above-described preliminary allocation made by the allocation module 27 is transferred to the conversion module 31, which generates the CNC programs. The actual machining times are obtained by calculator module 32 from the machining times specified on the list of FIG. 4 for the machining operations and the positioning times necessary for positioning the workpieces and the turrets. With these actual machining times, the cycle times are now checked in block 46 as to how they differ from each other. If these cycle times still have no differences, or acceptable differences, as before, then the preliminary allocation is maintained, and the allocation module 27 stops its work. If the differences among the actual resultant cycle times are too great, however, then on the basis of the real machining times, the distribution of machining operations is revised. To that end, a return is made to block 44. This is done, for instance, by re-entering block 84 in FIG. 7. However, it is also possible to perform the allocation operation of blocks 80–83 over again. Because of updated machining times, it can arrive at a different result. The updated machining times are obtained, for instance, from the machining times that were ascertained after the CNC program was set up and that contain an approximate estimate for the positioning times. This estimate can be more precise than the specified machining time that was previously used as obtained from the list shown in FIG. 4.

The various software modules 27, 28, 29, 31, 32 and 35 are known by anyone with ordinary skill in the pertinent art. Some functions are implemented in C++, while others are implemented in Visio-Studio, both of which are available from Microsoft.

A summary of key features, operations and advantages of the invention will be presented below.

Because of the automatic allocation of machining operations performed in accordance with the invention, it is sufficient to specify a description of the machining operations to be performed, referred to a workpiece coordinate system, and the required machining times for the workpiece. The distribution of the various machining operations to individual machining stations and their components is done automatically.

This considerably simplifies operation of the machining system for the operator. For workpieces on which many individual machining operations have to be performed and which require that the workpieces be repositioned repeatedly for succeeding machining operations performed in the various machining stations, the operator no longer has to think about which work spindle will perform the machining on the workpiece from what direction, or how the desired outcome of a machining operation is to be converted into positioning commands for the work spindle or for its advancement. Control of the movement of the work spindles in the machining stations is done solely on the basis of a coordinate system referred to the workpiece, without precise knowledge being required of the programmer about which work spindle of which machining station performs the machining operation, and in which direction the work spindle is moved.

Thus, the invention can be used to program complex machines or systems that comprise a plurality of machines or machining stations. This is particularly significant in the production of very sophisticated workpieces, which require machining by many individual steps. The invention enables the user to set up a processing chain of working operations simply and securely.

Each machining station is preferably connected to at least one or more adjusting devices, with which the machining station can be positioned relative to the workpiece. The direction in which the positioning relative to the workpiece is done depends on the workpiece position. The conversion of the workpiece coordinates into the coordinates of the machining stations is done automatically on the basis of the information set forth in the allocation table.

For performing the allocation of machining operations to the machining stations, the allocation module first obtains a list of machining operations, at least some of which are to be performed in a certain sequence, such as first drilling a bore hole and then cutting a thread to form a threaded bore. The allocation module also finds the longest machining operations and distributes these to the individual machining stations before it distributes the shorter ones. For example, if there are three machining stations, the allocation module searches for the three longest machining operations and allocates one of them to each machining station. This is done taking into account the chaining of machining operations specified by the list 16 shown in FIG. 4. In addition, from the remaining work operations on the list, those with the longest machining time are found and allocated to the machining station having the cycle in which there is still the most machining time available. This is always done taking into account the specified chaining of machining operations as a further sorting criterion. If for reasons of such chaining, two machining operations have to be allocated to one machining station and in it to the same turret, and if the sum of machining times of the two machining operations is greater than an intended cycle time, then the cycle time is increased to that sum.

Once the individual machining operations have been distributed to the various machining stations, the allocation module checks whether existing differences between the cycle times for the machining stations are greater than the shortest existing machining times. If so, the machining operations with the shortest machining times are shifted, if possible. If these machining operations are located in machining stations that have a longer cycle time than other machining stations, then they are shifted to a machining station with a shorter cycle time. However, if conversely they are in machining stations that have a shorter cycle time, then these short machining operations are shifted to machining stations with a longer cycle time, and for compensation purposes, machining operations with a longer machining time are shifted from these machining stations into the machining stations that have shorter cycle times. This can readily be carried out with computerized steps arrived at by anyone with ordinary skill in the art and, thus, no further details are deemed necessary.

Once a distribution of the various machining operations to the machining stations, and their turrets and work spindles has been completed by the allocation module, machine control instructions and data can be set up on the basis of this allocation. Accordingly, a CNC program is generated in the conversion module and contains all the machining instructions, positioning data and positioning commands required to perform the machining operations. This then yields the actual cycle times required to perform the machining operations in the machining stations, and these cycle times can be inputted back to the allocation module 27. If it is found that the cycle times in the various machining stations still essentially agree with one another, as before, then the selected allocation is maintained. If not, then the compensation module can be used again to vary the allocation of machining operations to individual machining stations and work spindles. Machining times plus the requisite adjustment times and positioning times can then be used. These adjustment times and positioning times of the previously selected allocation provide the basis for arriving at a revised allocation, and this can in turn be checked by the calculation module 32. In this way, in an iterative calculation process, an optimized allocation can ultimately be achieved.

Advantageously, the invention serves not only to set up the machine control instructions and data for the individual machining stations, independently of whether the operator knows which machining operations are to be performed in which machining station, but also serves to correct the machine control settings as a function of completed sample workpieces. This purpose is served by a measuring instrument which checks random samples, or randomly produced batches of workpieces, for dimensional accuracy. The measurement is performed in a coordinate system which, for instance, is workpiece-specific. If the measured values for the dimensions of the workpiece deviate from predetermined values, an automatic readjustment of the applicable machining stations and components thereof can be done. To that end, the portion of the CNC program that controls the work spindle that performs the applicable machining operation is adapted or altered. Thus, the operator need no longer individually ascertain which machining station is performing a machining operation that defines the problematic workpiece dimension. In accordance with the invention, access to this information is available in an allocation table that has been generated using the allocation module and which forms the basis for distributing the requisite machining operations to the individual machining stations. Via the allocation table, the deviations, ascertained in the measurement coordinate system, of the actual values from the specified values for the problematic workpiece dimensions are converted into the coordinates of the applicable machining station referred to by the allocation table. On the basis of this coordinate system of the machining station, the conversion module can calculate a correspondingly altered portion of the CNC program.

Although specific embodiments of the present invention have been described in detail above, various modifications thereto will be readily apparent to anyone with ordinary skill in the art. For example, the invention can be used with machining stations in a single machine tool to fabricate the workpieces, and also with a plurality of machine tools operated by a central control.

Memories 61, 62, 63, 71, 72, 73 can be combined in a single memory, perhaps with memory 24. These and all other such modifications are intended to fall within the scope of the present invention as defined by the following claims.

We claim:

1. A machining system for machining a workpiece, comprising:
    a plurality of machining stations with each one having at least one work spindle;
    means for providing machining information related to a plurality of machining operations specific to a particular workpiece;
    distribution means for automatically allocating the plurality of machining operations to the plurality of machining stations; and
    processing means for controlling said machining stations in accordance with the machining information related to the allocated machining operations.

2. The machining system of claim 1, wherein the means for providing the machining information related to the plurality of machining operations comprises a memory in which the machining information is stored.

3. The machining system of claim 1, wherein the distribution means comprises:
    means for determining a preliminary machining cycle time applied to each of the machining stations,
    means for automatically selecting from among the plurality of machining operations and filling-in said preliminary machining cycle time for the plurality of machining stations with the selected machining operations until all of said machining operations have been selected, to generate a preliminary allocation of machining operations,
    means for determining resultant machining cycle times for the respective machining stations based on said machining information corresponding to the machining operations selected and allocated in said preliminary allocation of machining operations, and
    means for re-allocating the machining operations if the resultant machining cycle times based on the preliminary allocation vary from each other by more than a predetermined difference.

4. The machining system of claim 3, wherein the selecting means selects machining operations in order of their respective machining times, with the machining operation having the longest machining time being selected first.

5. The machining system of claim 4, wherein the means for providing the plurality of machining operations includes means for specifying a required sequencing for designated machining operations, and wherein said selecting means selects machining operations in accordance with the required sequencing.

6. The machining system of claim 1, wherein said processing means includes means for converting the machining information related to the allocated machining operations into machining control instructions.

7. The machining system of claim 6, further comprising measuring means for checking workpiece dimensions machined in accordance with the allocated machining operations to produce a correction output, and wherein said processing means comprises means for correcting the machining control instructions in accordance with the correction output.

8. The machining system of claim 6, wherein the processing means comprises means for determining a calculated machining cycle time for each of the machining stations based on the machining control instructions, and means for re-allocating the machining operations if the calculated machining cycle times based on the machining control instructions vary from each other by more than a predetermined difference.

9. The machining system of claim 1, wherein the distribution means comprises means for determining a cycle time for each of the machining stations by totaling machining times for all of the machining stations allocated thereto, and means for re-allocating the machining operations if the machining cycle times obtained from the machining times based on the preliminary allocation vary from each other by more than a predetermined difference.

10. A method for machining a workpiece with a plurality of machining stations, with each one having at least one work spindle, comprising:
    providing machining information related to a plurality of machining operations specific to a particular workpiece;
    automatically allocating the plurality of machining operations to the plurality of machining stations; and
    controlling the machining stations in accordance with the machining information related to the allocated machining operations.

11. The method of claim 10, wherein the step of providing the machining information related to the plurality of machining operations comprises retrieving the machining information from a memory.

12. The method of claim 10, wherein the step of automatically allocating the plurality of machining operations comprises:
    determining a preliminary machining cycle time applied to each of the machining stations,
    automatically selecting from among the plurality of machining operations and filling-in said machining cycle time for the plurality of machining stations with the selected machining information until all of said machining operations have been selected, to generate a preliminary allocation of machining operations,
    determining resultant machining cycle times for the respective machining stations based on the preliminary allocation, and
    re-allocating the machining operations if the resultant machining cycle times based on the preliminary allocation vary from each other by more than a predetermined difference.

13. The method of claim 12, wherein the selecting step selects machining operations in order of their respective machining times, with the machining operation having the longest machining time being selected first.

14. The method of claim 12, wherein the step of providing the plurality of machining operations includes specifying a required sequencing for designated machining operations, and wherein said selecting step selects machining operations in accordance with the required sequencing.

15. The method of claim 10, wherein said controlling step includes converting the machining information related to the allocated machining operations into machining control instructions.

16. The method of claim 15, further comprising checking workpiece dimensions machined in accordance with the allocated machining operations to produce a correction output, and wherein said controlling step comprises correcting the machining control instructions in accordance with the correction output.

17. The method of claim 15, wherein the controlling step comprises determining a calculated machining cycle time for each of the machining stations based on the machining control instructions, and re-allocating the machining operations if the calculated machining cycle times based on the machining control instructions vary from each other by more than a predetermined difference.

18. The method of claim 10, wherein the allocating step comprises determining a cycle time for each of the machining stations by totaling machining times for all of the machining stations allocated thereto, and re-allocating the machining operations if the machining cycle times obtained from the machining times based on the preliminary allocation vary from each other by more than a predetermined difference.

19. An article of manufacture for use in a computerized machining system, for machining a workpiece with a plurality of machining stations each one having at least one work spindle, and having a computer-readable code means for:
providing machining information related to a plurality of machining operations specific to a particular workpiece;
automatically allocating the plurality of machining operations to the plurality of machining stations; and
controlling the machining stations in accordance with the machining information related to the allocated machining operations.

20. The article of manufacture of claim 19, wherein the function of providing the machining information related to the plurality of machining operations comprises retrieving the machining information from a memory.

21. The article of manufacture of claim 19, wherein the function of automatically allocating the plurality of machining operations comprises:
determining a preliminary machining cycle time applied to each of the machining stations,
automatically selecting from among the plurality of machining operations and filling-in said machining cycle time for the plurality of machining stations with the selected machining information until all of said machining operations have been selected, to generate a preliminary allocation of machining operations,
determining resultant machining cycle times for the respective machining stations based on the preliminary allocation, and
re-allocating the machining operations if the resultant machining cycle times based on the preliminary allocation vary from each other by more than a predetermined difference.

22. The article of manufacture of claim 21, wherein the selecting function selects machining operations in order of their respective machining times, with the machining operation having the longest machining time being selected first.

23. The article of manufacture of claim 21, wherein the function of providing the plurality of machining operations includes specifying a required sequencing for designated machining operations, and wherein said selecting function selects machining operations in accordance with the required sequencing.

24. The article of manufacture of claim 19, wherein said controlling function includes converting the machining information related to the allocated machining operations into machining control instructions.

25. The article of manufacture of claim 24, wherein the computer-readable code means further provides the function of checking workpiece dimensions machined in accordance with the allocated machining operations to produce a correction output, and wherein said controlling function comprises correcting the machining control instructions in accordance with the correction output.

26. The article of manufacture of claim 24, wherein the controlling function comprises determining a calculated machining cycle time for each of the machining stations based on the machining control instructions, and re-allocating the machining operations if the calculated machining cycle times based on the machining control instructions vary from each other by more than a predetermined difference.

27. The article of manufacture of claim 19, wherein the allocating function comprises determining a cycle time for each of the machining stations by totaling machining times for all of the machining stations allocated thereto, and re-allocating the machining operations if the machining cycle times obtained from the machining times based on the preliminary allocation vary from each other by more than a predetermined difference.

28. A machining system (1),
having a plurality of machining stations (S1, S2, S3), which each have at least one work spindle (A1) and serve to perform specified machining operations (B1, . . . , BN) on workpieces,
having a control device, which has an allocation module (27) for automatically allocating the specified machining operations (B1, . . . , BN) to the machining stations (S1, S2, S3) and to the work spindle (A1).

29. The machining system of claim 28, characterized in that the allocation module is connected to a memory device, which contains a list of the machining operations (B1, . . . , BN) to be performed on the workpiece.

30. The machining system of claim 29, characterized in that in the list, the assigned machining times (ti) are noted.

31. The machining system of claim 29, characterized in that in the list, the necessary machining sequences are noted.

32. The machining system of claim 29, characterized in that the allocation module allocates the required machining operations (Bi) of the list to the machining stations (S1, S2, S3) in such a way that chronological differences between the machining operations to be performed in the machining stations (S1, S2, S3) are minimized.

33. The machining system of claim 32, characterized in that the allocation module generates station lists with the machining operations to be performed for each machining station (S1, S2, S3) and each work spindle (A1, A2, A3, A4, A5, A6), and that there is a calculation module, which converts the station lists into the control data files, which contain positioning commands for the machining stations (S1, S2, S3).

34. The machining system of claim 33, characterized in that the allocation module is connected to the calculation module, in order to obtain the cycle times that result from combining the individual machining operations.

35. The machining system of claim 34, characterized in that the allocation module checks the allocation made of the machining operations to machining stations (S1, S2, S3) on the basis of the cycle times obtained from the calculation module and changes it, if the calculated cycle times at the individual machining stations (S1, S2, S3) have differences that exceed a predetermined upper limit.

36. A machining system,
  having a plurality of machining stations (S1, S2, S3), which each have at least one work spindle (A1) and serve to perform specified machining operations (B1, . . . , BN) from different machining directions, on multi-sided workpieces,
  having a control device, which has a memory device for storing an allocation of the specified machining operations (B1, . . . , BN) to the machining stations (S1, S2, S3) and to the work spindle (A1),
  having a coordinate transformation device for converting workpiece-referred desired dimensions into positioning commands for the machining stations (S1, S2, S3) in their own coordinate systems,
  wherein the coordinate transformation device is connected to the memory device in order to perform the coordinate transformation on the basis of the allocation, stored in the memory device, of the specified machining operations (B1, . . . , BN) to the machining stations (S1, S2, S3) and to the work spindle (A1).

37. The machining system of claim 36, characterized in that in the machining stations (S1, S2, S3), each comprising at least two machining units (R1, R2), are disposed, which are arranged to machine the workpiece from two different directions.

38. The machining system of claim 37, characterized in that for positioning the workpieces in the machining stations (S1, S2, S3), workpiece receptacles are provided.

39. The machining system of claim 38, characterized in that the workpiece receptacles are each connected to positioning devices, which serve to move the workpiece, in the applicable machining station (S1, S2, S3), into machining positions different from one another and fix them in these positions as needed.

40. The machining system of claim 36, characterized in that in the control device, each of the machining stations (S1, S2, S3) is allocated its own coordinate system.

41. The machining system of claim 36, characterized in that the machining units (S1, S2, S3) are embodied as identical to one another, at least within groups.

42. The machining system of claim 36, characterized in that the workpieces are conveyed in synchronization from one machining station to another by means of a transporting device.

43. The machining system of claim 36, characterized in that the coordinate transformation device is connected to receive an output of a correction device, which is connected to receive an output of a measuring instrument that is arranged to measure actual workpiece dimensions.

44. An article of manufacture for use in a computerized machining system, and having a computer-readable code means, wherein the machining system includes a plurality of machining stations (S1, S2, S3), in which workpieces can be put in different machining positions by means of positioning devices and machined in these positions, and each of the machining stations having machining units (R1, R2), which have work spindles (A1, A2, . . . ), which can be positioned with respect to the workpieces by means of adjusting devices,
  wherein the computer-readable code means receives workpiece dimensions of the workpiece to be produced and the machining operations (Bi) required to produce it and automatically distributes the machining operations (Bi), in accordance with their order to the machining stations (S1, S2, S3) and machining units (R1, R2) in such a way that the utilization of the individual machining stations (S1, S2, S3) and machining units (R1, R2) is essentially equal.

45. An article of manufacture for use in a computerized machining system, and having a computer-readable code means, wherein the machining system includes a plurality of machining stations (S1, S2, S3), in which workpieces can be put in different machining positions by means of positioning devices and machined in these positions, and each of the machining stations having machining units (R1, R2), which have work spindles (A1, A2, . . . ), which can be positioned with respect to the workpieces by means of adjusting devices,
  wherein the computer-readable code means has an allocation module, which automatically allocates the required machining operations to certain machining stations, workpiece positions and machining units (R1, R2) and work spindles (A1, A2, . . . ) and generates corresponding control instructions in machining station-specific coordinate systems.

46. The article of manufacture of claim 45, characterized in that in a machining system having a measurement station for measuring the workpiece dimensions of a fully machined workpiece, it uses the measurement data in a coordinate system referred to the workpiece to monitor the outcome of machining.

47. The article of manufacture of claim 46, characterized in that the computer-readable code means changes the control instructions via the allocation module, if the measurement data are outside a specified tolerance.

* * * * *